United States Patent
Eavenson, Sr. et al.

(10) Patent No.: US 8,931,248 B2
(45) Date of Patent: Jan. 13, 2015

(54) REPLACEABLE MOWER BLADE ASSEMBLY

(75) Inventors: Jimmy N. Eavenson, Sr., Aurora, OH (US); Axel Schaedler, Olmsted Falls, OH (US); Dave Hein, Elyria, OH (US); Robert L. Jira, Jr., Middleburg Heights, OH (US)

(73) Assignee: MTD Products Inc, Valley City, OH (US)

( * ) Notice: Subject to any disclaimer, the term of this patent is extended or adjusted under 35 U.S.C. 154(b) by 335 days.

(21) Appl. No.: 13/494,473

(22) Filed: Jun. 12, 2012

(65) Prior Publication Data

US 2013/0327007 A1 Dec. 12, 2013

(51) Int. Cl.
*A01D 34/52* (2006.01)
*A01D 34/73* (2006.01)

(52) U.S. Cl.
USPC .................. 56/295; 56/255; 56/17.5

(58) Field of Classification Search
USPC .......... 56/12.7, 17.5, 255, 289, 295, DIG. 17, 56/DIG. 20; 30/335, 337, 339
See application file for complete search history.

(56) References Cited

U.S. PATENT DOCUMENTS

| | | | |
|---|---|---|---|
| 1,558,021 A | 10/1925 | Libi | |
| 1,996,813 A | 4/1935 | Jeppsson | |
| 2,167,222 A * | 7/1939 | Shelor | 56/17.5 |
| 2,232,261 A | 2/1941 | Orr | |
| 2,477,442 A | 7/1949 | Cramer, Jr. et al. | |
| 2,527,472 A * | 10/1950 | Wolf | 56/192 |
| 2,651,159 A | 9/1953 | Roundtree, Sr. | |
| 2,924,059 A | 2/1960 | Beeston, Jr. | |
| 2,963,844 A | 12/1960 | Engler | |
| 3,050,925 A | 8/1962 | Robinson et al. | |
| 3,103,093 A | 9/1963 | House, Jr. | |
| 3,152,432 A | 10/1964 | Scarnato et al. | |
| 3,243,944 A | 4/1966 | Michaud | |
| 3,321,894 A | 5/1967 | Ingram | |
| 3,327,460 A | 6/1967 | Blackstone | |

(Continued)

FOREIGN PATENT DOCUMENTS

| EP | 115853 A1 * | 8/1984 |
|---|---|---|
| FR | 2792162 A3 | 10/2000 |

(Continued)

OTHER PUBLICATIONS

International Search Report and Written Opinion dated Feb. 17, 2014 for corresponding International Patent Application No. PCT/US2013/045076.

(Continued)

*Primary Examiner* — Alicia Torres
(74) *Attorney, Agent, or Firm* — Wegman, Hessler & Vanderburg

(57) ABSTRACT

A replaceable mower blade assembly for attaching to a rotatable spindle, motor, or engine crankshaft is provided. The blade assembly includes a mounting member having a plurality of ends extending from a central bore that is configured to receive the spindle, motor, or engine crankshaft. Each end includes an indexing aperture and a plurality of caps. A locking mechanism is operatively connected to the mounting member, and each arm of the locking mechanism includes a pin. A cutting blade is removably attachable to each end of the mounting member and the cutting blade includes an indexing aperture and a plurality of keyhole apertures. Each pin of the locking mechanism is insertable and engageable with an indexing aperture of both the mounting member and the cutting blade for positively securing each cutting blade.

6 Claims, 8 Drawing Sheets

(56) References Cited

U.S. PATENT DOCUMENTS

| | | |
|---|---|---|
| 3,395,522 A | 8/1968 | Petrus |
| 3,563,015 A | 2/1971 | Renfroe |
| 3,683,606 A | 8/1972 | Staines |
| 3,698,168 A | 10/1972 | Mott et al. |
| 3,949,541 A | 4/1976 | Henry |
| 3,958,402 A | 5/1976 | Bouet |
| 4,176,508 A | 12/1979 | Baumann et al. |
| 4,229,933 A | 10/1980 | Bernard |
| 4,313,297 A | 2/1982 | Maier |
| 4,375,148 A | 3/1983 | Beck |
| 4,413,468 A | 11/1983 | Hockersmith |
| 4,586,257 A | 5/1986 | Rittenhouse |
| 4,611,459 A | 9/1986 | Cartner |
| 4,696,432 A | 9/1987 | Russ et al. |
| 4,712,364 A | 12/1987 | Oxley |
| 4,750,320 A | 6/1988 | Liebl |
| 4,815,264 A | 3/1989 | Mijnders |
| 4,936,884 A | 6/1990 | Campbell |
| 5,018,347 A | 5/1991 | Feilen |
| 5,019,113 A | 5/1991 | Burnell |
| 5,271,212 A | 12/1993 | Anderson |
| 5,287,686 A | 2/1994 | Lindsay |
| 5,383,329 A | 1/1995 | Cornell, III et al. |
| 5,438,819 A | 8/1995 | Dallman |
| 5,454,216 A | 10/1995 | Myszka |
| 5,502,958 A | 4/1996 | Plamper |
| 5,575,071 A | 11/1996 | Phillips et al. |
| 5,724,796 A | 3/1998 | Plamper |
| 5,791,131 A * | 8/1998 | Hill et al. .................... 56/295 |
| 5,839,263 A | 11/1998 | Biernath et al. |
| 5,862,598 A | 1/1999 | Lee |
| 5,881,540 A | 3/1999 | Miller |
| 5,946,895 A | 9/1999 | Martens |
| 6,182,430 B1 | 2/2001 | Blarek et al. |
| 6,205,755 B1 | 3/2001 | Bontrager et al. |
| 6,367,235 B1 * | 4/2002 | Moynihan ................ 56/17.5 |
| 6,470,661 B1 | 10/2002 | Plamper |
| 6,612,039 B2 | 9/2003 | Kakiuchi et al. |
| 6,769,236 B2 | 8/2004 | Schaedler |
| 6,935,095 B1 | 8/2005 | Sluder |
| 7,703,268 B2 | 4/2010 | Yanke |
| 7,775,026 B2 | 8/2010 | Bever |
| 7,871,080 B2 | 1/2011 | Marini et al. |
| 7,958,710 B2 | 6/2011 | Gilpatrick et al. |
| 8,136,333 B1 | 3/2012 | Levin et al. |
| 2002/0106279 A1 | 8/2002 | Selby |
| 2004/0035010 A1 | 2/2004 | Kakiuchi et al. |
| 2004/0093842 A1 | 5/2004 | Cooper |
| 2005/0210852 A1 | 9/2005 | Lancaster |
| 2005/0229573 A1 | 10/2005 | Curran |
| 2006/0156706 A1 * | 7/2006 | Eavenson et al. .......... 56/17.5 |
| 2006/0168933 A1 | 8/2006 | Hill, Jr. |
| 2006/0230622 A1 | 10/2006 | Skluzak |
| 2008/0277127 A1 | 11/2008 | Dixon |
| 2009/0308045 A1 | 12/2009 | Bever |
| 2010/0101201 A1 * | 4/2010 | Yanke ........................ 56/295 |
| 2010/0257832 A1 | 10/2010 | Smith |
| 2012/0110970 A1 | 5/2012 | Blarek |
| 2013/0327007 A1 | 12/2013 | Eavenson, Sr. et al. |

FOREIGN PATENT DOCUMENTS

| | | |
|---|---|---|
| NL | 8403911 | 7/1986 |
| WO | 2013188335 | 12/2013 |

OTHER PUBLICATIONS

Husqvarna introduces a tool-free way to change mower blades; consumerreports.org; Oct. 29, 2012.

Groundkeeper; Amazone; Mar. 2, 2014.

International Search Report and Written Opinion dated Jun. 4, 2014 for corresponding International Patent Application No. PCT/US2014/016436.

* cited by examiner

REPLACEABLE MOWER BLADE ASSEMBLY

FIELD OF THE INVENTION

The present invention relates to lawn and garden equipment, and more particularly, to a replaceable blade assembly for a mower.

BACKGROUND OF THE INVENTION

Lawn mowers such as walk-behind mowers, riding mowers, garden tractors, and the like include a cutting deck that includes at least one cutting blade configured to cut grass and other vegetation. However, the cutting blade often contacts rocks, tree branch, or other debris which causes the blade to dull or otherwise become ineffective. Typical changeable blades for rotary mowers include one-piece blades that are attached and retained using hardware which requires tools to remove and replace the blade, pivot-blades attached onto one-piece mounting plates which also require tools to remove and replace the blade, and one-piece blades that are attached and retained but do not require tools for removal and replacement. Replacement of the one-piece blades involves replacing the entire blade even though one of the sharpened edges may not need replacement. Also, the one-piece blades are also typically designed for finish-cut operations, and where durability and impact strength are major concerns, damage to spindles, motors and engine crankshafts with one piece blades might not be avoidable. Pivot-blades are often used in rough-cut operations and typically do not produce high cutting quality.

For high quality cutting operations, the cutting blades need to be stable and solidly retained to provide the highest quality of cut and safe operation.

Therefore, a need exists for a mower blade assembly having replaceable blades that can be easily replaced without the need for tools. A need also therefore exists for a mower blade assembly in which the blades are replaceable and self-securing while also being easily removable.

BRIEF SUMMARY OF THE INVENTION

According to one aspect of the present invention, a mower blade assembly attachable to a rotatable spindle, motor, or engine crankshaft is provided. The blade assembly includes a mounting member having a central bore and at least a first end and a second end extending from said central bore, wherein an indexing aperture is formed through each of the ends. The blade assembly also includes a locking mechanism operatively connected to the mounting member. The locking mechanism includes a base and at least two arms extending from the base in a cantilevered manner. An actuatable pin extends from an end of each arm. At least two cutting blades are selectively attachable to the mounting member, wherein each of the cutting blades includes an indexing aperture formed therethrough, wherein each blade is operatively engageable to a corresponding end of the mounting member. Each of the pins of the locking mechanism is biased into selective engagement with the indexing aperture of the mounting member and the indexing aperture of one of the cutting blades for operatively connecting the cutting blade to the mounting member.

According to another aspect of the present invention, a mower blade assembly attachable to a rotatable spindle, motor, or engine crankshaft is provided. The blade assembly includes a mounting member having a central bore and a plurality of ends extending from the central bore, wherein each end includes an indexing aperture formed therethrough. The blade assembly also includes a locking mechanism operatively connected to the mounting member, the locking mechanism including a base and a plurality of arms extending from the base. Each arm includes a pin extending therefrom. Each of a plurality of cutting blades is removably attachable to one of the plurality of ends of the mounting member, wherein each cutting blade includes an indexing aperture formed therethrough. Each pin of the locking mechanism is biased into engagement with the indexing aperture formed in the mounting member and the indexing aperture formed in the cutting blade for positively positioning the cutting blade to the mounting member.

According to yet another aspect of the present invention, a mower blade assembly attachable to a rotatable spindle, motor, or engine crankshaft is provided. The blade assembly includes a channel-shaped mounting member having a central bore and a plurality of ends extending from the central bore, wherein each end includes an indexing aperture formed therethrough and a plurality of caps extending from a lower surface of the end and positioned about the indexing aperture. The blade assembly also including a locking mechanism operatively connected to the mounting member. The locking mechanism includes a base and a plurality of arms extending from the base in a cantilever manner, wherein each arm includes a pin extending therefrom. The blade assembly further includes a plurality of cutting blades, each of the plurality of cutting blades is removably attachable to one of the plurality of ends of the mounting member, wherein each cutting blade includes a central portion and a cutting portion extending from the central portion, the central portion being channel-shaped and including an indexing aperture and a plurality of keyhole apertures formed therethrough. The keyhole apertures are positioned about the indexing aperture. Each pin of the locking mechanism is biased into engagement with the indexing aperture formed in the mounting member and the indexing aperture formed in the cutting blade, and wherein each of the keyhole apertures of the cutting blades engageable with one of the caps of said mounting member for securing the cutting blade to the mounting member.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1:
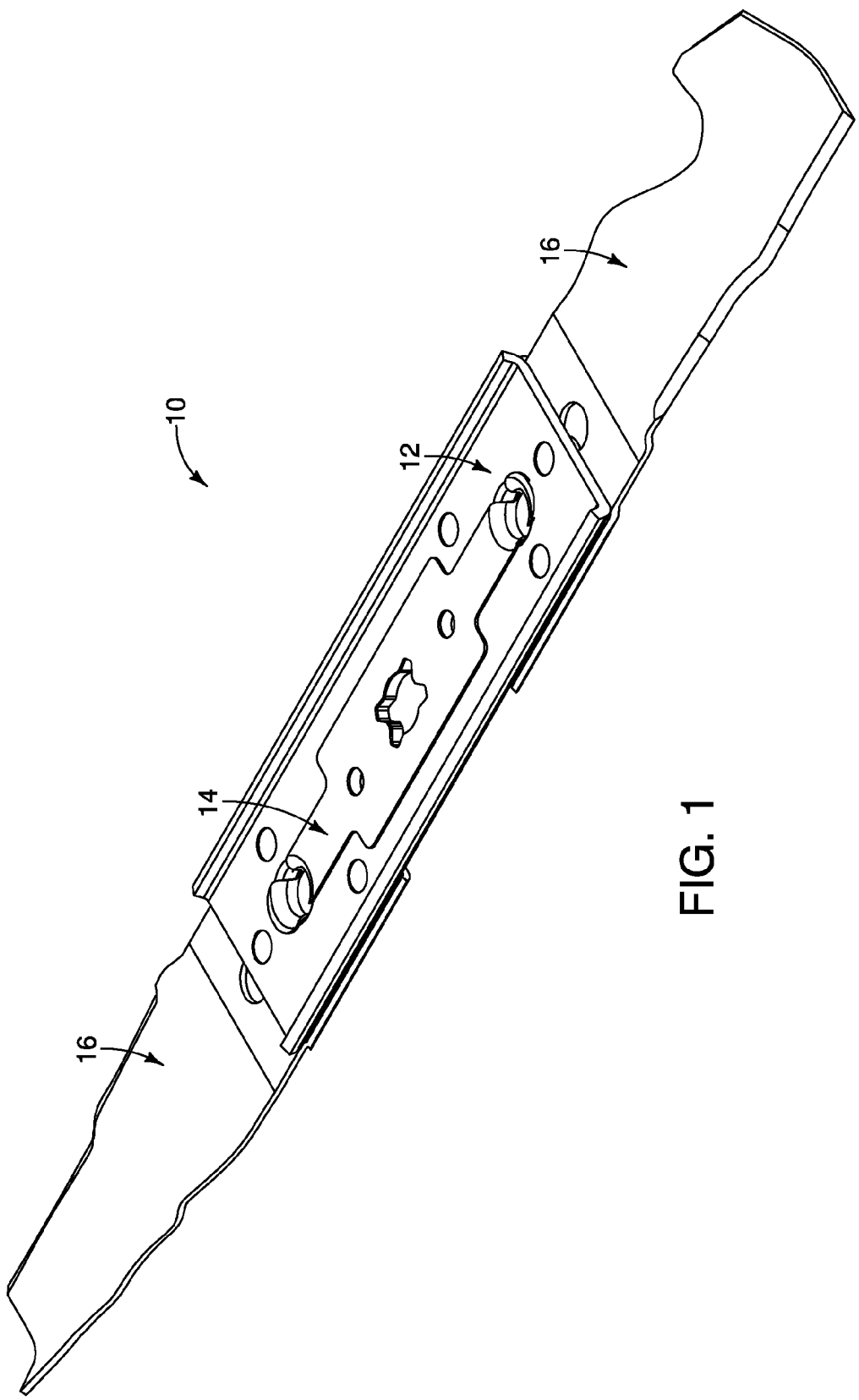
FIG. 1 is a top perspective view of an embodiment of a replacement mower blade assembly.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 2:
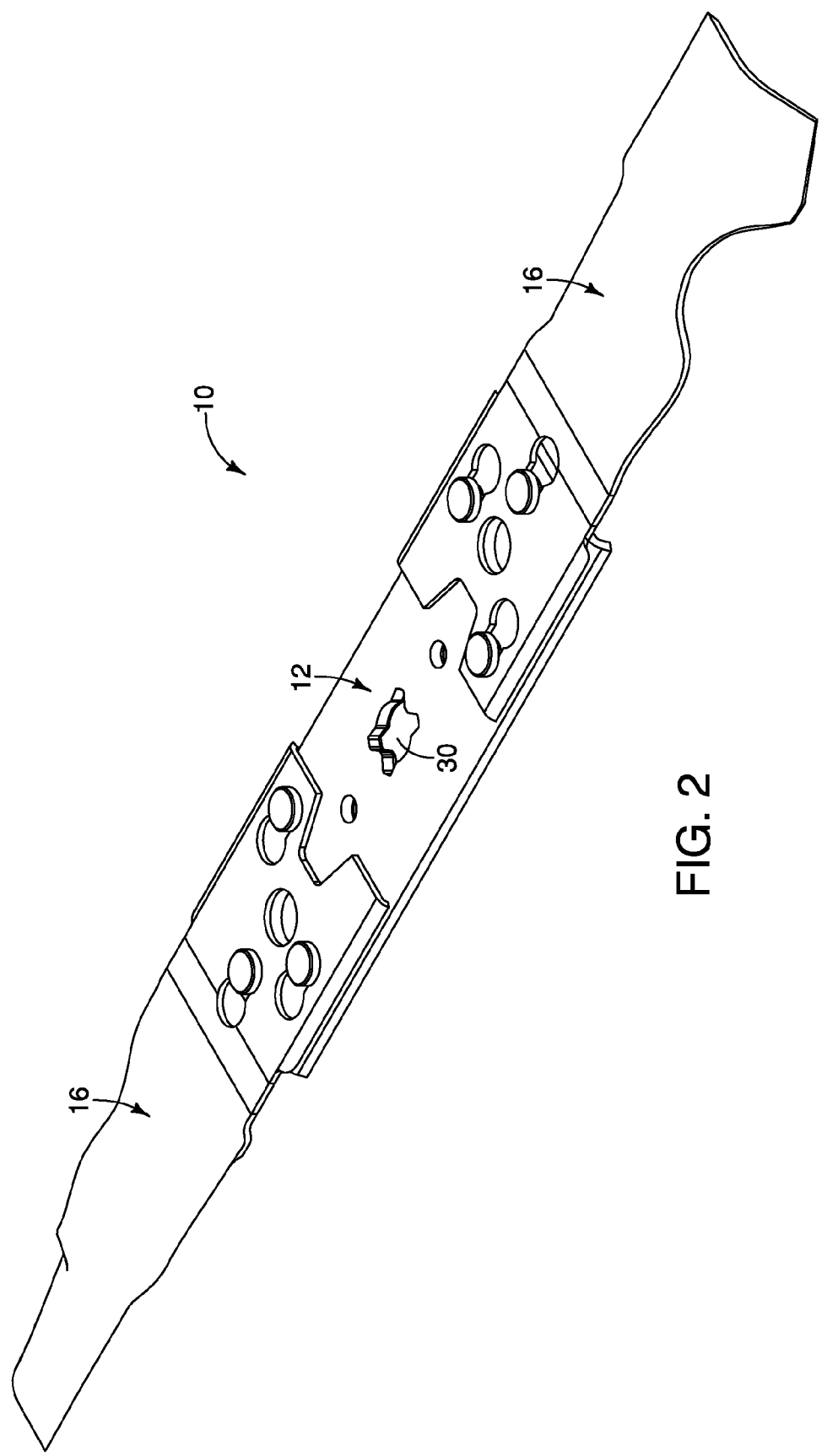
FIG. 2 is a bottom perspective view of the blade assembly shown in FIG. 1.
Figure 3:
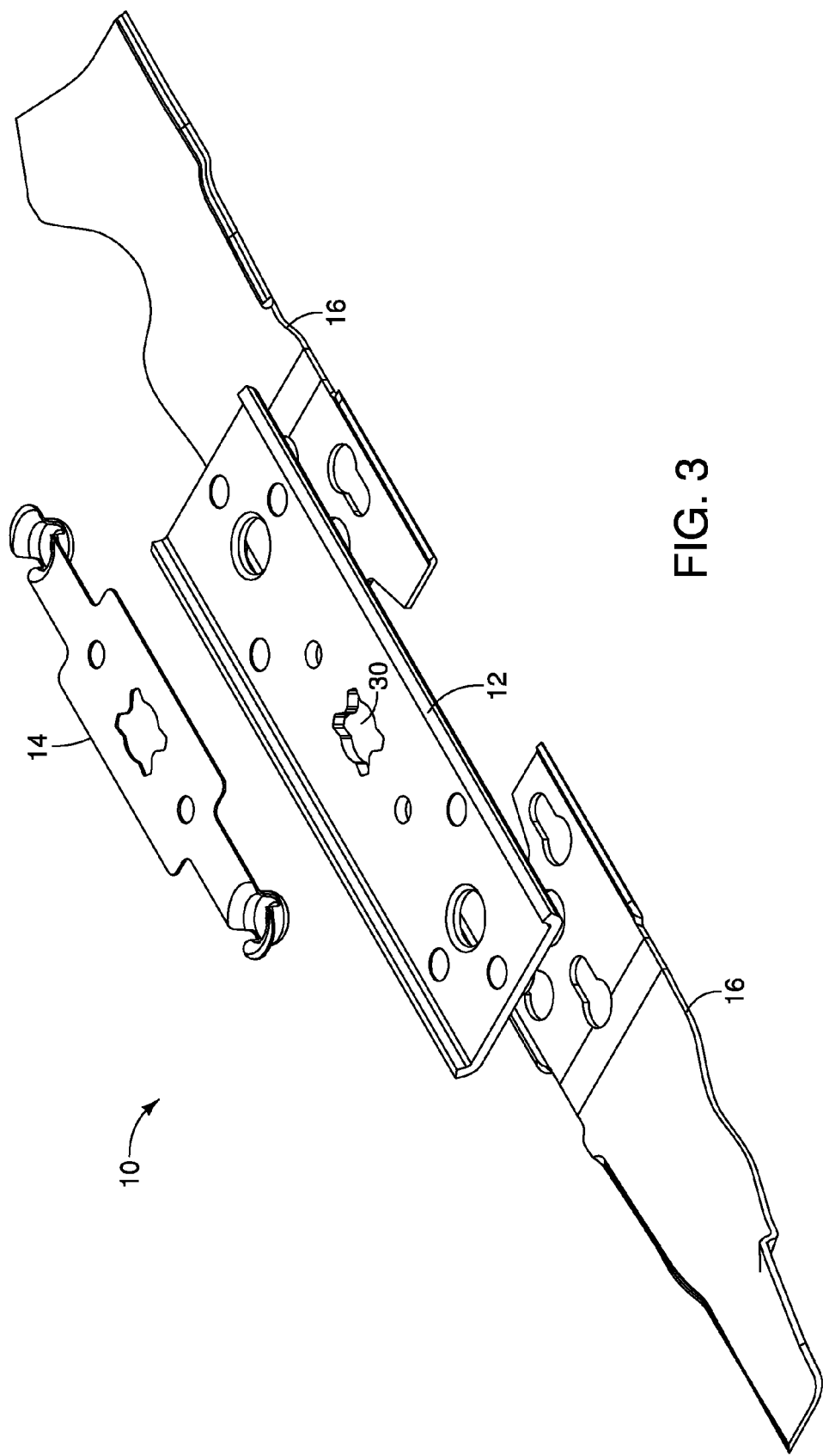
FIG. 3 is an exploded view of the blade assembly shown in FIG. 1.

Referring to FIGS. 1-2, an exemplary embodiment of a replacement mower blade assembly 10 is shown. The blade assembly 10 includes a mounting member 12, a locking mechanism 14, and a pair of opposing cutting blades 16. The mounting member 12 is operatively positioned within a cutting deck of any type of lawn mower, including a walk-behind style lawn mower, a garden tractor, a riding lawn mower, or the like. In an embodiment, the blade assembly 10 is connected to a motor or engine crankshaft (not shown) that extends downwardly through the cutting deck. In another embodiment, the blade assembly 10 is connected to a rotatable spindle (not shown) located within a cutting deck. The blade assembly 10 is removably connected within the deck and is rotatable about a substantially vertical rotational axis defined by the motor or engine crankshaft or the spindle to which it is attached.

In the exemplary embodiment illustrated in FIGS. 1-4, the mounting member 12 is an elongated structural member that provides a base to which the removable cutting blades 16 are attached as well as the member that allows the blade assembly 10 to be attachable to a mower. The mounting member 12 includes a first end 18, a second end 20 opposite the first end 18, an upper surface 22, an opposing lower surface 24, a first side edge 26 extending between the opposing ends 18, 20, and an opposing second side edge 28. The upper and lower surfaces 22, 24 form a substantially planar central portion of the mounting member 12, and the opposing side edges 26, 28 extend from the central portion in a curved manner. In an embodiment, the side edges 26, 28 are curved toward the upper surface 22 of the mounting member 12. In the illustrated exemplary embodiment, the side edges 26, 28 are curved in a like manner such that the mounting member 12 has a C-shaped or channel-shaped cross-section. Because the C-shaped cross-sectional shape increases the beam strength of the mounting member 12, it should be understood by one of ordinary skill in the art that the mounting member 12 may have any other similar cross-sectional shape that increases the beam strength. The curved side edges 26, 28 provide additional structural stiffness or rigidity to the mounting member 12 to resist longitudinal bending and torsional rotation while minimizing losses in efficiency due to contact with the cut grasses. The side edges 26, 28 are curved relative to the upper surface 22 at an angle of between about 30° to 90°.

Figure 4:
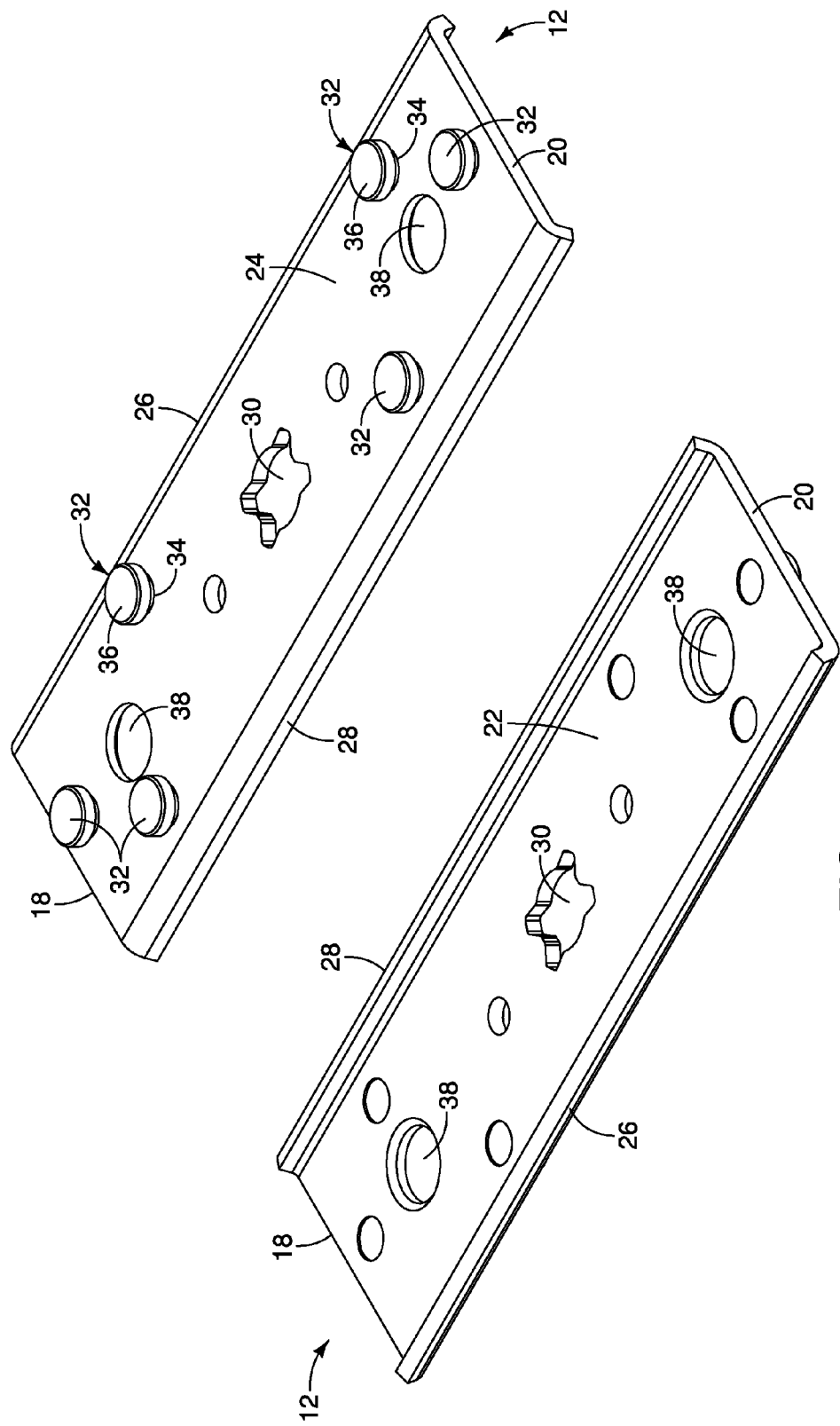
FIG. 4 is top and bottom perspective views of an exemplary embodiment of a mounting member.
Figure 5:
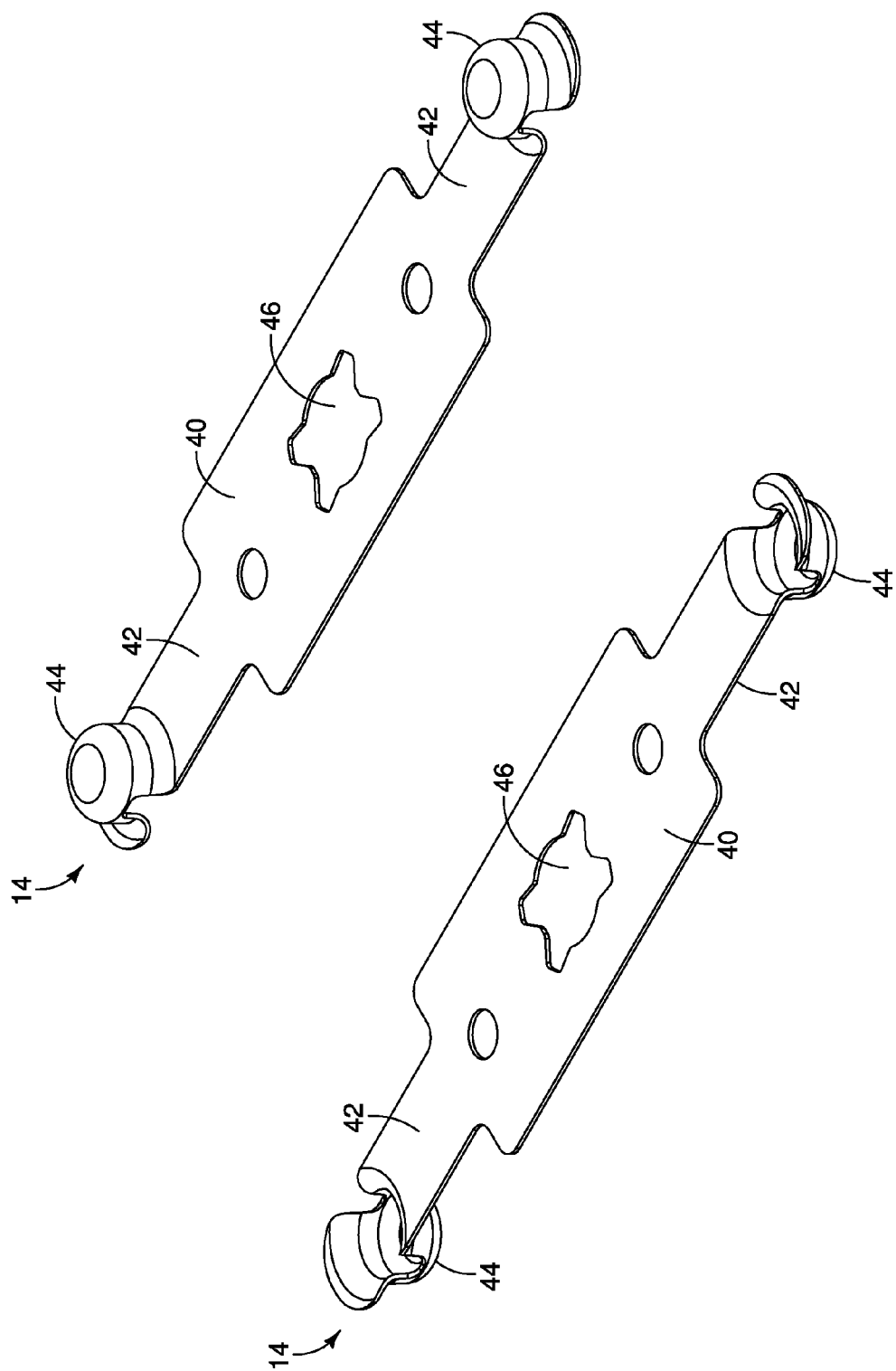
FIG. 5 is top and bottom perspective views of an exemplary embodiment of a locking mechanism.
Figure 7:
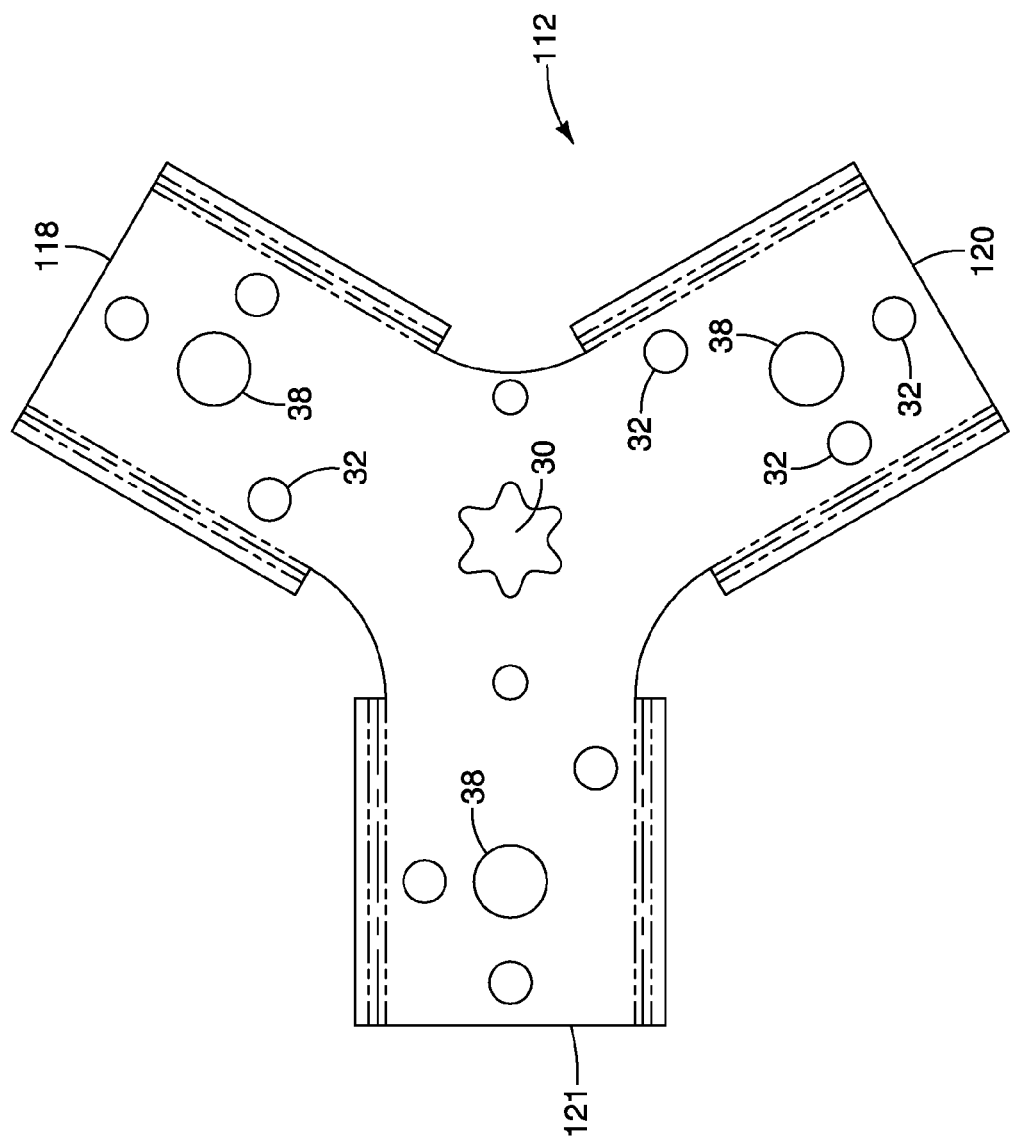
FIG. 7 is a top view of another exemplary embodiment of a mounting member.

In an embodiment, the mounting member 12 includes a central bore 30 formed through the thickness thereof, as shown in FIGS. 1-4. The central bore 30 is sized and shaped to receive a rotatable driving member such as a motor or engine crankshaft, a spindle, or any other rotatable member configured to be positioned within the central bore to cause the blade assembly 10 to selectively rotate about an axis substantially perpendicular to the upper surface 22. In an embodiment, the central bore 30 has a generally elongated X-shape, as shown in FIG. 4. In another embodiment, the central bore 30 has a six-point star shape, as shown in FIG. 7. It should be understood by one of ordinary skill in the art that the central bore 30 can be formed of any shape sufficient to receive a rotatable member that causes the blade assembly 10 to rotate thereabout.

In an embodiment, the mounting member 12 also includes a plurality of caps 32 extending perpendicularly from the lower surface 24 and positioned adjacent to each opposing end 18, 20, as shown in FIG. 4. The caps 32 protrude from the mounting member 12, and each cap 32 includes a base 34 that extends substantially linearly away from the lower surface 24 and a flange 36 that extends substantially laterally from the base 34. The flange 36 is spaced apart relative to the lower surface 24, thereby providing a gap between the base 34 and the outer radial edge of the flange 36, thereby creating a shoulder between the flange 36 and the lower surface 24 of the mounting member 12. The caps 32 function to receive and retain the cutting blades 16, as will be explained below. In the illustrated embodiment, the mounting member 12 includes three (3) caps 32 that are positioned adjacent to each of the opposing ends 18, 20 of the mounting member 12. It should be understood by one of ordinary skill in the art that any number of caps 32 may be positioned adjacent to each opposing end for receiving a cutting blade 16, but at least three caps 32 should be used to more evenly distribute the stresses applied to the mounting member 12 by the cutting blades 16. Each configuration of three caps 32 in the illustrated embodiment can be arranged such that the linear alignment between any two of the caps 32 is not parallel to the longitudinal or transverse axes of the cutting blade 16 attached to the corresponding set of caps 32. The caps 32 can also be arranged in a pattern that ensures proper cutting blade orientation and alignment when installed. The caps 32 can be further arranged such that any cutting blade 16 can be attached to either end 18, 20 of the mounting member 12. In an embodiment, the caps 32 are welded to the mounting member 12. In another embodiment, the caps 32 are riveted to the mounting member 12. It should be understood by one of ordinary skill in the art that the caps 32 can be attached to the mounting member 12 in any manner so as to provide a fixed rigid connection therebetween.

In an embodiment, the mounting member 12 further includes a pair of opposing indexing apertures 38 formed through the thickness of the mounting member 12, as shown in FIG. 4. Each indexing aperture 38 is positioned within the pattern of the caps 32 adjacent to each opposing distal end 18, 20 of the mounting member. The indexing aperture 38 is configured to receive a portion of the locking mechanism 14 (FIG. 3) for positively locating each of the cutting blades 16 attached to the mounting member 12. In the illustrated exemplary embodiment shown in FIG. 4, the indexing apertures 38 have a substantially circular shape, but it should be understood by one of ordinary skill in the art that the indexing apertures 38 can be formed as any shape.

As shown in FIGS. 1-3 and 5, the locking mechanism 14 is operatively connected to the mounting member 12 and is configured to releasably secure each of the cutting blades 16 to the mounting member 12. In an embodiment, the locking mechanism 14 is fixedly attached to the mounting member 12. In another embodiment, the mounting member 12 is positioned adjacent to the upper surface 22 of the mounting member 12 and is secured in a sandwiching manner between the mounting member 12 and the engine crankshaft or spindle. The locking mechanism 14 is an elongated member having a rectangular base 40, a pair of arms 42 extending from opposing ends of the base 40, and a spring-loaded pin 44 or tab extending from the end of each arm 42 opposite the base 40. It should be understood by one of ordinary skill in the art that the locking mechanism 14 may be formed of any shape. The pins 44 are spring-loaded due to the cantilever configuration of the pins 44 being positioned at the distal end of the arms 42, and the pins 44 being movable or actuatable for selectively releasing or engaging a cutting blade 16, as will be explained below. In an embodiment, the arms 42 are aligned with the base 40, and each arm 42 has a width that is smaller than the width of the base 40. Although the arms 42 are illustrated as having a smaller width than the base 40 in the exemplary embodiment, it should be understood by one of ordinary skill in the art that the base 40 can also include the arms 42 such that the pins 44 extend from the base 40 which has a substantially consistent width along the length thereof. The arms 42 and the elongated base 40 are configured to act as cantilever springs when the locking mechanism 14 is secured about the central aperture 46. The pins 44 extend away from the plane of the base 40 and arms 42, wherein the pins 44 are configured to extend through the indexing aperture 38 (FIG. 4) of the mounting member 12. Each pin 44 is configured to be selectively engaged with a cutting blade 16.

Figure 6:
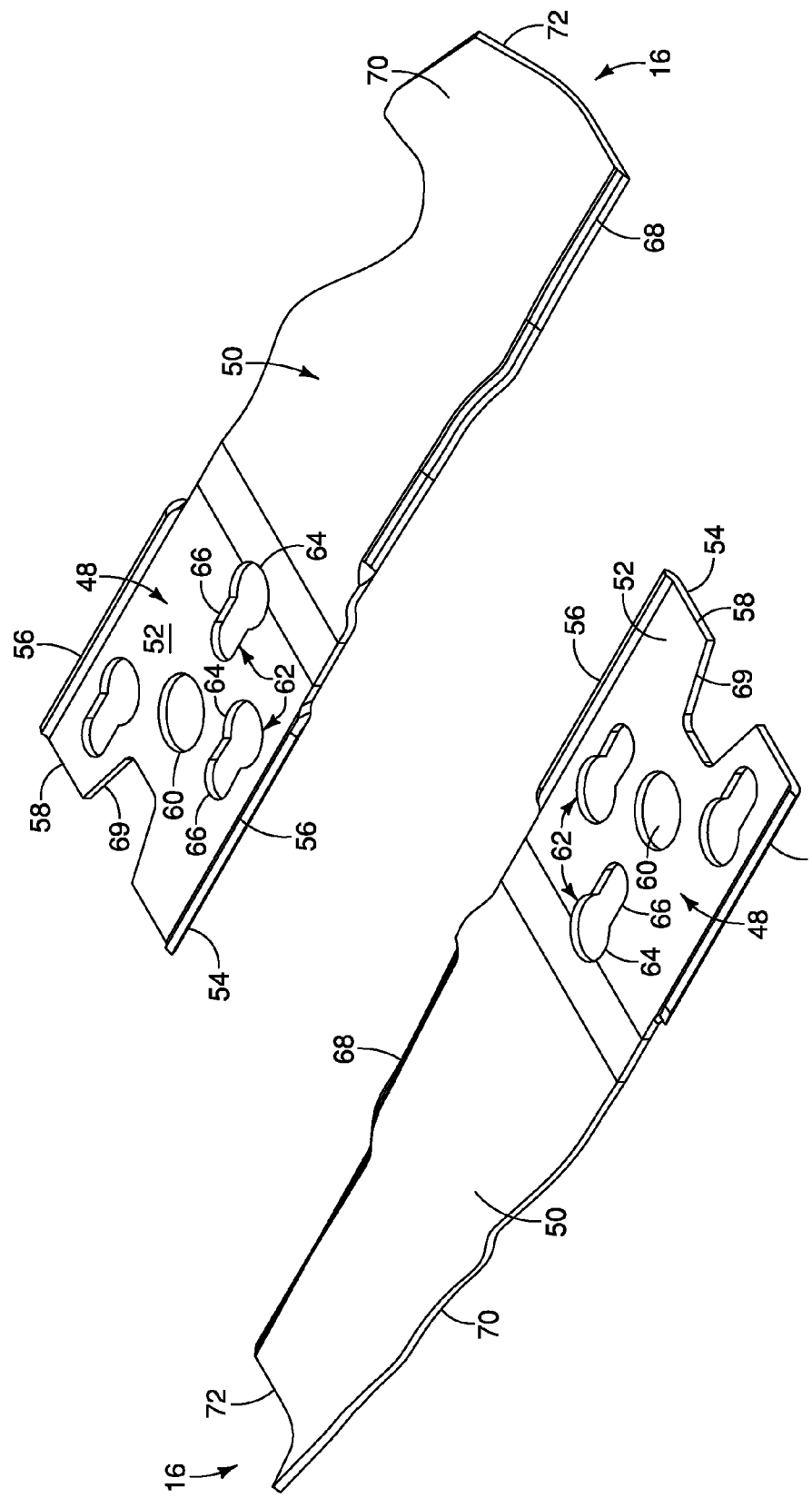
FIG. 6 is top and bottom perspective views of an exemplary embodiment of a cutting blade.

FIG. 6 illustrates an exemplary embodiment of a replaceable cutting blade 16 that is configured to be selectively attachable to the mounting member 12. The cutting blade 16 includes a central portion 48 and a cutting portion 50 integrally formed with and extending from the central portion 48. The central portion 48 is configured to be operatively connected to the mounting member 12 while the cutting portion 50 extends beyond the corresponding distal end 18, 20 of the mounting member 12 for cutting grass and vegetation. The central portion 48 includes an upper surface 52, a lower surface 54, and opposing side edges 56. The upper and lower surfaces 52, 54 form a substantially flat body, and the opposing sides edges 56 extend from the body in a curved or formed angular sections. In an embodiment, the side edges 56 of the cutting blade 16 have a similar curvature as the first and second side edges 26, 28 of the mounting member 12 such that when the cutting blade 16 is attached to the mounting member 12, the curved edges of both the mounting member 12 and the blade 16 form a nesting arrangement. The matching channel shapes of the central portion 48 of the cutting blade 16 and the mounting member 12 reduce the shear loading of the caps 32 during conditions such as blade impact, whereby a majority of impact energy between the cutting blade 16 and the object being impacted is diverted from shear to tension. The central portion 48 includes a first end 58 extending between the opposing side edges 56. In an embodiment, the first end 58 is substantially linear. In another embodiment, the first end 58 includes a notch 69 formed therein, wherein the notch 69 is configured to provide clearance between the central portion 48 of the cutting blade 16 and an adapter (not shown) which is used to attach the cutting blade 16 to an engine crankshaft.

As shown in FIG. 6, an exemplary embodiment of the central portion 48 of the cutting blade 16 includes an indexing aperture 60. The indexing aperture 60 of the cutting blade 16 is configured to be alignable with the indexing aperture 38 of the mounting member 12 when the cutting blade 16 is properly seated against the mounting member 12. The indexing aperture 60 can be formed as any shape, but the shape of the indexing aperture 60 should be shaped to correspond to the shape of the indexing aperture 38 of the mounting member 12 and the shape of the pin 44 of the locking mechanism 14.

The indexing aperture 60 is positioned between a plurality of keyhole apertures 62, wherein each of the keyhole apertures 62 is configured to receive a corresponding cap 32 extending from the mounting member 12. Each keyhole aperture 62 includes a receiving portion 64 and a channel portion 66, as shown in FIG. 6. The receiving portion 64 is a rounded hole formed through the thickness of the central portion 48 of the cutting blade 16. The receiving portion 64 is sized to allow the flange 36 of the cap 32 to pass through. The channel portion 66 is an elongated channel extending from the receiving portion 64. The channel portion 66 is sized to be slightly larger than the outer diameter of the base 34 of the cap 32 such that the base 34 is capable of sliding along the channel portion 66. The end of the channel portion 66 opposite the receiving portion 64 is configured to be a stop to prevent the cutting blade 16 to slide past the end of the mounting member 12.

The cutting portion 50 of the cutting blade 16 extends from the central portion 48 opposite the first end 58, as shown in FIGS. 1-3 and 6. The cutting portion 50 of the cutting blade 16 can be shaped and configured for different operational purposes, such as grass cutting, material collection, mulching, "rough cut", blowing, or the like. For example, for grass cutting operations, the cutting blade 16 includes a sharpened edge configured to cut grass. High-quality grass cutting operations, such as "finish cutting" the cutting blades 16 need to be stable and solidly retained to provide the highest quality of cut and safe operation. "Rough cut" grass cutting operations may have a sharpened edge for cutting grass and other vegetation, but the cutting blade 16 may include a pivot portion that pivots during the cutting operation which produces a reduced quality of cut relative to a finish cut blade. The "rough cut" blade may also include a filament attachment means. For mulching operations, the edge of the cutting blade 16 opposite the sharpened cutting edge may form a sail or raised portion that produces increased air pressure above the cutting blade 16 and reduced air pressure below so as to create lift for the grass and clippings. For a blower operation, the cutting portion 50 can be shaped like an impeller such that the air movement into and out of the cutting deck in enhanced. This blower operation can be useful in clearing walkways, driveways, or the like. In other embodiments, the cutting portion 50 can be formed to perform any of these or other operations, or any combination thereof.

In the illustrated embodiment, the cutting portion 50 of the cutting blade 16 is configured as a mulching blade for not only cutting grass and vegetation but also to circulate the cut grass and vegetation for additional contact and cutting to reduce the size of the particles for ease of assimilation into the uncut grass. As shown in FIG. 6, the cutting portion 50 extends from the central portion 48 and includes a leading edge 68, a trailing edge 70, and a distal end 72 extending between the leading and trailing edges 68, 70 and located at the end of the cutting portion 50 opposite the central portion 48. The leading edge 68 is sharpened for cutting grass and other vegetation. In an embodiment, the leading edge 68 is substantially linear between the central portion 48 and the distal end 72. In the illustrated embodiment, the leading edge 68 extends between the central portion 48 and the distal end 72 in a nonlinear manner, wherein the leading edge 68 includes a transition such that the portion of the leading edge 68 adjacent to the central portion 48 is substantially coplanar therewith and the portion of the leading edge 68 adjacent to the distal end 72 is vertically lower than the central portion 48. In an embodiment, the leading edge 68 is sharpened the entire distance between the central portion 48 and the distal end 72 of the cutting blade 16. In another embodiment, the leading edge 68 is sharpened only a portion of the distance between the central portion 48 and the distal end 72. In an embodiment, the trailing edge 70 extending between the central portion 48 and the distal end 72 is substantially linear. In the illustrated embodiment, the portion of the trailing edge 70 adjacent to the distal end 72 is curved or formed angularly upwardly, thereby forming a sail or the like. This sail is configured to create lift, or a pressure differential between the area above the cutting portion 50 and below the cutting portion 50. The lift generated by the sail causes the cut grass and vegetation to be lifted and recirculated such that the sharpened leading edge 68 can cut the vegetation multiple times and reduce the particle size thereof. In another embodiment, the sail can be designed primarily to lift and eject the cut grass for discharge and collection purposes.

In an embodiment, the cutting blades 16 are formed of the same material as the mounting member 12 to which they are attached. In another embodiment, the cutting blades 16 are formed of a different material than the mounting member 12, wherein the material used for the cutting blades 16 can be chosen to optimize wear resistance properties as well as provide a high hardness for durability. In yet another embodiment, the mounting member 12 may be formed of a different material than the cutting blades 16, wherein the material used for the mounting member 12 can be chosen to optimize the energy absorption properties of the mounting member 12 to increase durability and reduce the stresses and wear-and-tear on the cutting blades 16. Initial assembly of the blade assembly 10 includes positioning the locking mechanism 14 immediately adjacent to the upper surface 22 of the mounting member 12 such that the central aperture 46 of the locking mechanism 14 and the central bore 30 of the mounting member 12 are substantially aligned. Once the locking mechanism 14 is aligned, each pin 44 of the locking mechanism 14 extends through a corresponding indexing aperture 38 in the mounting member 12. Once the pins 44 extend through the indexing apertures 38, the mounting member 12 is positively secured to the rotatable engine or motor crankshaft or spindle (not shown) such that the curved first and second side edges 26, 28 are directed upwardly away from the ground. Securing the mounting member 12 to the motor or engine crankshaft or spindle also secures the locking mechanism 14 therebetween, thereby preventing movement or rotation of the locking mechanism 14 relative to the mounting member 12. A cutting blade 16 is then attached to mounting member 12 by aligning the receiving portion 64 of the keyhole apertures 62 of the cutting blade 16 with the flanges 36 of the caps 32 of the mounting member 12. The cutting blade 16 is then pushed against the mounting member 12 and pulled radially outward until the bases 34 of the caps 32 contact the ends of the channel portions 66 of the keyhole apertures 62. Once the caps 32 contact the ends of the keyhole apertures 62, the pins 44 of the locking mechanism 12 are biased by the spring configuration of the locking mechanism 12 into engagement with the cutting blade 16 such that the pins 44 extend through both the mounting member 12 as well as the indexing apertures 60 of the cutting blade 16. The same method is used to attach a second cutting blade 16 to the opposing end of the mounting member 12.

In operation, as the blade assembly 10 rotates about the spindle, motor, or engine crankshaft to which it is attached, the radial gravitational force on the cutting blades 16 ensures a positive attachment between the cutting blades 16 and the mounting member 12 by forcing the caps 32 of the mounting member into contact with the end of each receiving portion 64 of the keyhole aperture 62 of the cutting blade 16. The cutting blades 16 and the blade assembly 10 can be configured for clockwise or counterclockwise rotation about the spindle, motor, or engine crankshaft.

For toolless removal and replacement of one or both of the cutting blades 16 from the mounting member 12, the pin 44 of the cutting blade 16 being removed is pressed such that it disengages from the cutting blade 16. Once the pin 44 has been pushed out of the indexing apertures 60 of the cutting blade 16, the cutting blade 16 is pushed toward the mounting member 12 in a sliding motion such that the bases 34 of the caps 32 slide into the receiving portions 64 of the keyhole apertures 62. The cutting blade 16 is then pulled downwardly away from the mounting member 12 as the flanges 36 pass through the receiving portions 64, thereby completely disengaging the cutting blade 16 from the mounting member 12. Replacement of the cutting blade 16 includes repeating the step described above for attaching the cutting blade 16 to the mounting member 12.

In another embodiment of the blade assembly 10, the cutting blade 16 includes the caps extending therefrom while the mounting member includes the corresponding keyhole apertures.

Another exemplary embodiment of the mounting member 112 of the blade assembly 10 is shown in FIG. 7. The mounting member 112 includes a central bore 30 formed through the thickness thereof. The mounting member 112 further includes a first end 118, a second end 120, and a third end 121 extending radially outward relative to the central bore 30. In an embodiment, each of the ends 118, 120, 121 extend radially outward and oriented at about 120° relative to each other such that they are equally spaced from each other. In another embodiment, the angular orientation can be unequally spaced for noise abatement or other purposes. The three-end mounting member 112 allows for a cutting blade 16 to be attached to each of the ends 118, 120, 121, thereby providing a blade assembly 10 having three cutting blades 16. It should be understood by one of ordinary skill in the art that the pattern of caps 32 extending from the mounting member adjacent to each end should be the same for each end such that a single cutting blade 16 design can be used for all different variations of the mounting member.

Figure 8:
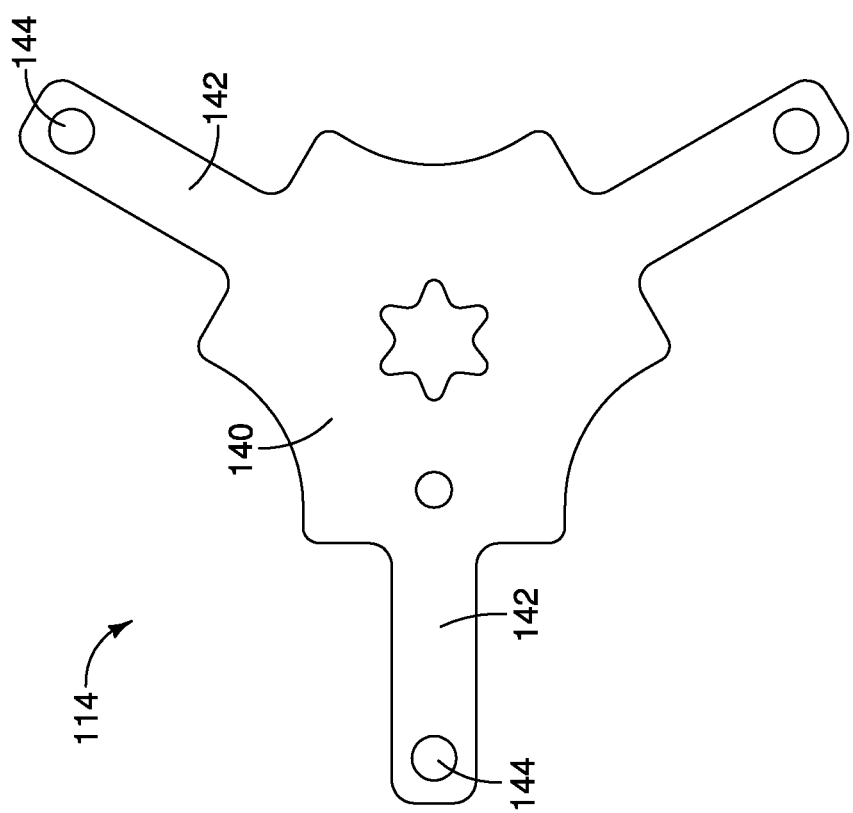
FIG. 8 is a top view of another exemplary embodiment of a locking mechanism.

As shown in FIG. 8, another exemplary embodiment of the locking mechanism 114 is shown. The locking mechanism 114 includes a base 140 and three arms 142 extending from the base 140. The arms 142 are oriented at about 120° relative to each other. A pin 144 is located at the end of each arm 142 opposite the base 140. The locking mechanism 114 is configured to be positioned immediately adjacent to the mounting member 112 such that each of the pins 144 engages a corresponding indexing aperture of the mounting member 112. It should be understood by one of ordinary skill in the art that although the illustrated embodiments of the mounting member 12, 112 and locking mechanism 14, 114 have a 2- or 3-end shape, any number of a plurality of ends and arms can extend from the central bore 30 provided that the blade assembly 10 remains balanced about the central bore 30 as it rotates.

In an embodiment, the mounting member 12, the locking mechanism 14, and the cutting blades 16 are all formed of the same material. In another embodiment, the cutting blade 16 can be formed of a different material than the mounting member 12, thereby providing desirable properties to the cutting blade 16 which can increase the quality of cut of the sharpened edge while the material of the mounting member 12 can provide the strength and rigidity to allow for longer life of the cutting blades 16.

The blade assembly 10, as shown and described above, allows for cutting blades 16 to be easily attached or detached without the use of tools. Instead, the pins are actuatable, or pushable, which allows a cutting blade to be detachable from the mounting member. The pins also ensure proper engagement between the cutting blades and the mounting member by way of an indexing or positive locating attachment due to the biasing of the pins into engagement with the indexing apertures formed through both the mounting member and the blades.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A mower blade assembly attachable to a rotatable spindle, motor, or engine crankshaft, said mower blade assembly comprising:
    a mounting member having a central bore and at least a first end and a second end extending from said central bore, wherein an indexing aperture is formed through each of said ends, wherein said mounting member includes opposing side edges extending between said ends, said side edges being curved;
    a locking mechanism operatively connected to the mounting member, said locking mechanism including a base and at least two arms extending from said base in a cantilevered manner, and an actuatable pin extends from an end of each arm,
    at least two cutting blades selectively attachable to said mounting member, wherein each of said cutting blades including an indexing aperture formed therethrough, wherein each blade is operatively engageable to a corresponding end of said mounting member;
    wherein each of said pins of said locking mechanism is biased into selective engagement with said indexing aperture of said mounting member and said indexing aperture of one of said cutting blades for operatively connecting said cutting blade to said mounting member; and
    wherein said side edges of said mounting member are curved in a direction away from said cutting blade when said cutting blade is attached to said mounting member.

2. The mower blade assembly of claim 1, wherein said mounting member includes a plurality of caps extending therefrom and positioned adjacent to each end about said indexing aperture of said mounting member.

3. The mower blade assembly of claim 2, wherein each of said cutting blades includes a plurality of keyhole apertures formed through the thickness thereof, said keyhole apertures positioned about said indexing aperture of said cutting blade, and wherein said caps of said mounting member are insertable into said keyhole apertures of said cutting blade for selectively attaching each of said cutting blades to one of said ends of said mounting member.

4. The mower blade assembly of claim 1, wherein each of said cutting blades includes a central portion and a cutting portion extending therefrom, said central portion having opposing side edges that are curved such that when said cutting blade is attached to said mounting member, said curved side edges of said cutting blade are positioned adjacent to said curved side edges of said mounting member.

5. The mower blade assembly of claim 1, wherein said mounting member includes three ends extending from said central bore, and a cutting blade is attachable to each of said three ends.

6. The mower blade assembly of claim 5, wherein said locking mechanism includes three arms extending from said base, and each pin extending from each of said arms is selectively engageable with a corresponding indexing aperture formed in both said mounting member and said cutting blades.

* * * * *